DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 18, 1970

877 O.G. 491

T877,010
PHOTOGRAPHIC ELEMENT AND PROCESS
Robert C. Harvey, % Kodak Park Division,
Rochester, N.Y. 14650
Filed Feb. 11, 1970, Ser. No. 10,636
Int. Cl. G03c *7/16, 1/12*
U.S. Cl. 96—23
No Drawing. 9 Pages Specification

Color separation process in which photographic elements comprising a transparent support; coated thereon two silver bromoiodide sensitive emulsions, the first a panchromatically sensitized with the combination of 2,2′ cyanine dye, a thia-2′-cyanine dye and a selenocarbocyanine dye and coated at a silver coverage of from 400–700 mg. per sequare foot, a grain size of less than 0.5$\mu$ and a silver iodide content of 2.25 mol percent; the second emulsion of medium grain size of between 0.5–1.0$\mu$ containing about 4 mol percent silver iodide with a silver coverage of approximately 540 mg. per square foot and sensitive to blue radiation, but practically insensitive to green and red radiations and lastly a protective gelatin coat; and in which process the differently exposed negatives are processed under the same conditions to obtain equal gammas.